(12) United States Patent
Tullsson

(10) Patent No.: US 6,191,726 B1
(45) Date of Patent: Feb. 20, 2001

(54) PROCEDURE FOR THE ELIMINATION OF INTERFERENCE IN A RADAR UNIT OF THE FMCW TYPE

(75) Inventor: Bert-Eric Tullsson, Järfalla (SE)

(73) Assignee: Celsiustech Electronics AB, Jarfalla (SE)

( * ) Notice: Under 35 U.S.C. 154(b), the term of this patent shall be extended for 0 days.

(21) Appl. No.: 09/269,565

(22) PCT Filed: Oct. 16, 1997

(86) PCT No.: PCT/SE97/01733
§ 371 Date: May 12, 1999
§ 102(e) Date: May 12, 1999

(87) PCT Pub. No.: WO98/16847
PCT Pub. Date: Apr. 23, 1998

(30) Foreign Application Priority Data

Oct. 17, 1996 (SE) .................................................. 9603810
Dec. 20, 1996 (SE) .................................................. 9604774
Dec. 20, 1996 (SE) .................................................. 9604775

(51) Int. Cl.[7] .................................................. G01S 13/34
(52) U.S. Cl. .......................... 342/128; 342/89; 342/159; 342/195; 342/196; 708/300; 708/322
(58) Field of Search .................... 342/120–124, 342/128–133, 159–164, 175, 194–197, 200, 201, 89, 118; 708/319, 300, 322, 323

(56) References Cited

U.S. PATENT DOCUMENTS

| 4,766,436 | 8/1988 | Crepin et al. ........................ 342/122 |
| 5,194,870 | * 3/1993 | Pearce et al. ........................ 342/128 |
| 5,294,933 | * 3/1994 | Lee et al. ............................ 342/159 |
| 5,381,357 | * 1/1995 | Wedgwood et al. ................. 708/319 |

FOREIGN PATENT DOCUMENTS

WO 96/15462  5/1996  (WO) .

OTHER PUBLICATIONS

Skolnik, Introduction to Radar Systems, 2nd Ed., McGraw–Hill, 1980, Chapter 3.

* cited by examiner

Primary Examiner—Bernarr E. Gregory
(74) Attorney, Agent, or Firm—Pollock, Vande Sande & Amernick, RLLP

(57) ABSTRACT

In a procedure for the elimination of interferences of short duration, such as pulses, in a radar unit of the FMCW type, the transmitted and received signals are combined to form a useable signal. According to the procedure, the contribution to the Fourier Transform of the interferences of short duration are filtered out of the Fourier Transform in the frequency domain by an FIR filter with complex coefficients. The procedure requires no additional signal processing between sampling and applying the Fourier Transform, gives very little widening of strong contrasts in the Fourier Transform and is fast and simple to implement in a signal processor.

6 Claims, 4 Drawing Sheets

PROCEDURE FOR THE ELIMINATION OF INTERFERENCE IN A RADAR UNIT OF THE FMCW TYPE

FIELD OF THE INVENTION

This invention concerns a procedure for the elimination of interferences of short duration, such as pulses, in a radar unit of the FMCW type with linear frequency sweep, where the transmitted and received signals are combined to form a useable signal in the form of a difference signal, the beat signal, with a wave for each target, where the frequency, amplitude and phase of the wave contain the information about the target and where the beat signal is sampled and a Fourier Transform is applied. The procedure can be used within the field of mobile radar, but can also be used for other FMCW radar applications, e.g. where low signal levels are required.

BACKGROUND OF THE INVENTION

The principle for linear FMCW radar is well-known, see for example Skolnik, introduction to Radar Systems, 2nd Ed., McGraw-Hill 1980, chapter 3. Technical advances have in recent years resulted in an increased use of FMCW radar units, which will not be considered further here. A linear FMCW (Frequency Modulated Continuous Wave) radar unit works in principle as follows.

A frequency sweep controls an oscillator with a variable frequency so that the transmitted frequency varies periodically. Each period has principally three parts, namely a constant base frequency, a linear frequency sweep and a rapid return to base frequency. The linear frequency sweep is the time when the radar unit is "carrying out useful work" and often constitutes 70–80% of the total time (work factor 0.7–0.8).

For the sake of simplicity in the discussion below the radar unit and its target are stationary. In the case of moving targets or moving radar units the Doppler effect also comes into play. For most actual FMCW systems, however, the Doppler effect only involves a minor correction to the following.

The propagation time from the radar unit to a target and back is typically a few microseconds. A signal received from a target has therefore the frequency that was transmitted a certain time previously. As the frequency is swept this is not the same frequency that is being transmitted. The received frequency also has a linear frequency sweep. As the received frequency sweep and the transmitted frequency sweep are parallel with a time-displacement equal to the propagation time, as a result for a fixed target the difference in frequency between the transmitted and received signal will be constant. This constant frequency difference is given by the product between the propagation time to the target and the gradient of the frequency sweep expressed as frequency per unit of time.

The signal processing in a linear FMCW radar unit consists principally of the transmitted and received signals being combined, so that the difference signal (the beat signal) is generated. This signal is the sum of a number of sine waves, where each sine wave represents a radar target. The sine waves have different frequencies, amplitudes and phase positions in accordance with the principle that large amplitude corresponds to large target, high frequency corresponds to target at a great distance. The Doppler effect (due to the relative speed) mainly affects the phase positions.

In order to determine what targets are being observed and what are their sizes and relative speeds, the difference signal is frequency analyzed. The frequency analysis is best carried out digitally by having the difference signal passed through an anti-alias filter and sampled at a constant sampling rate. After this the sampled signal is multiplied by a window function to reduce the amplitude of the signal at the start and end of the sampling period and is sent to a signal processor that carries out a Discrete Fourier Transform, DFT, usually with a fast algorithm, known as an FFT, Fast Fourier Transform. The Fourier Transform is generally complex but for a real time signal (difference signal) it has a certain degree of symmetry. In order to be able to use FFT algorithms the number of samples is usually selected as a power of two (256, 512, 1024, . . . ). 256 samples give 256 FFT coefficients, but if the signal is real the symmetry means that of these 256 values only 128 (actually 129) are independent.

By Fourier Transform, for example by FFT, the signal is divided up into a number of discrete frequency components, sines. Each frequency corresponds as above to a distance. The amount of a complex FFT coefficient is a measurement of the radar target area (the received power) for the target in the corresponding frequency window (distance window). The FFT performs what is known as a coherent integration of the target signal, which is advantageous. The subsequent signal processing in the system is carried out digitally on the calculated FFT coefficients.

It can be shown that the nominal width of a distance window is inversely proportional to the change in frequency of the linear FMCW sweep during the sampling period. For a distance resolution of 1 m a change in frequency of 150 MHz is required. In order to change the distance resolution, the gradient of the frequency sweep can for example be changed while retaining the same constant sampling time.

The sampling rate limits the frequencies of the beat signal that can be studied and thereby the total observed distance area. The width of this "useable band" that lies parallel to the linear FMCW sweep is often less than 1 MHz.

A linear FMCW radar unit can be subject to interference if it receives signals other than its own transmitted signals reflected from various targets. The radar unit can be subject to interference from other radar units, including pulse radar units, pulse compression radar units and other FMCW radar units. Interferences of short duration arise for instance when the linear sweep in the FMCW radar unit is subject to interference from base frequencies or return frequencies from another FMCW radar unit.

An interference of short duration (a pulse) during the sampling period has a short extent in the time domain and is very broad-band in the frequency domain. A short but strong interference only affects a few samples of the beat signal but can totally mask many frequency windows in the Fourier Transform. The "noise level" in the Fourier Transform can appear to be increased, so that small targets can be masked by the interference.

A known method for suppressing interferences of short during is to eliminate the interference in the time domain by inserting a low value, e.g. 0, ("clipping") during the time the interference is detected. Clipping to 0 can in itself eliminate the interference from the time signal but introduces instead interference in the complex FFT, as the useable signal is also affected. Among other things targets with strong contrast are widened (get side beams). The interferences in the FFT can be modified, but never eliminated, by means of various compromises in the implementation of the clipping.

Another method is described in our patent application filed at the same time as this application. In accordance with this method, interference in the beat signal is detected and eliminated in the time domain and the beat signal is reconstructed during the period with interference by prediction based on samples without interference.

SUMMARY OF THE INVENTION

The purpose of this invention is to offer a method of eliminating interferences of short during which works the frequency domain instead of in the time domain. The method is characterized by the contribution of the interference of short duration to the Fourier Transform in the frequency domain being filtered out of the Fourier Transform by means of an FIR filter with complex coefficients. The method has the advantage that no additional signal processing is required between the sampling and the Fourier Transform in the form of, for example, DFT or FFT. A further advantage is that the method results in very little widening of strong contrasts in the Fourier Transform. The method is also very fast and very simple to implement in a signal processor.

In accordance with one suitable method, at least one factor per interference of short duration is introduced into the FIR filter. In order to obtain real coefficients, however, in accordance with another suitable method at least one further factor can be introduced per interference of short duration.

The detection of interference of short duration can either take place in the time domain or in the frequency domain. If the detection of interference of short duration takes place in the time domain, in accordance with yet another suitable method, the filter coefficients of the FIR filter in each factor are calculated from the position of the interference in the time domain. In accordance with yet another suitable method, where the detection of interference of short duration takes place in the frequency domain, the filter coefficients of the filter are determined adaptively from the Fourier Transform.

The method according to the present invention will be described in greater detail with reference to the enclosed figures, wherein:

DETAILED DESCRIPTION OF THE PREFERRED EMBODIMENT(S)

Figure 1:
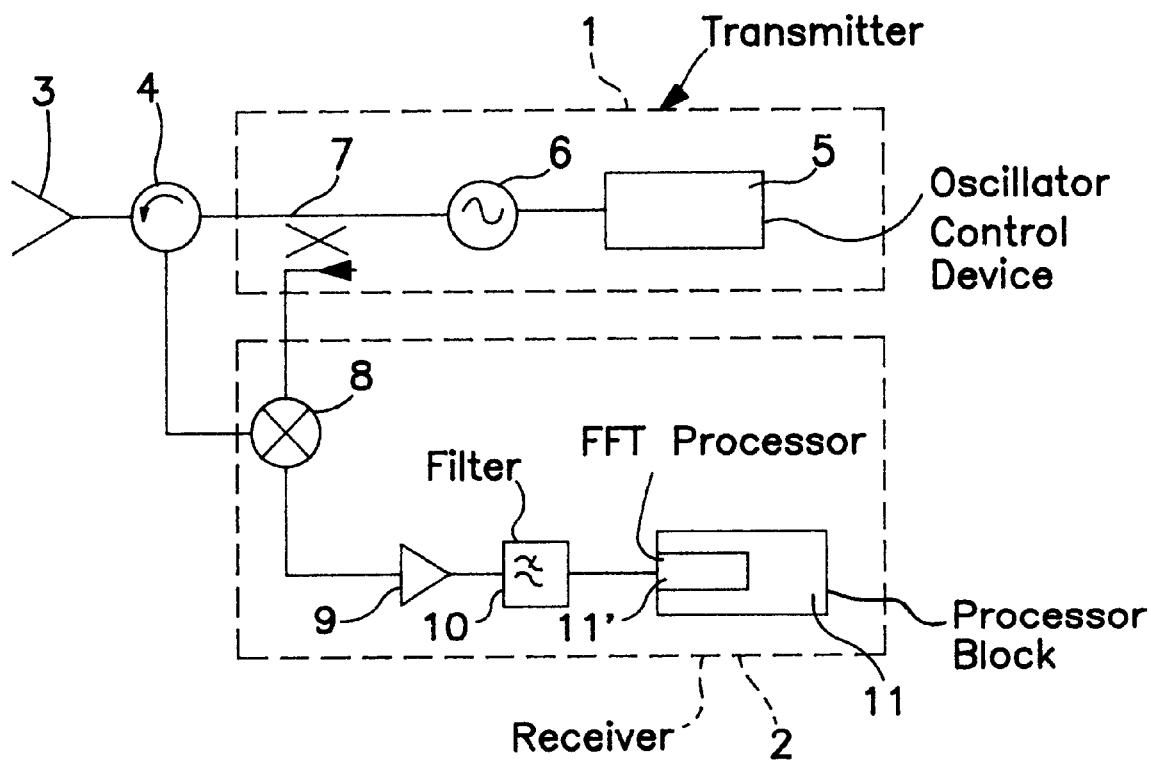
FIG. 1 shows diagrammatically the principle for how a linear FMCW radar unit works.
Figure 2:
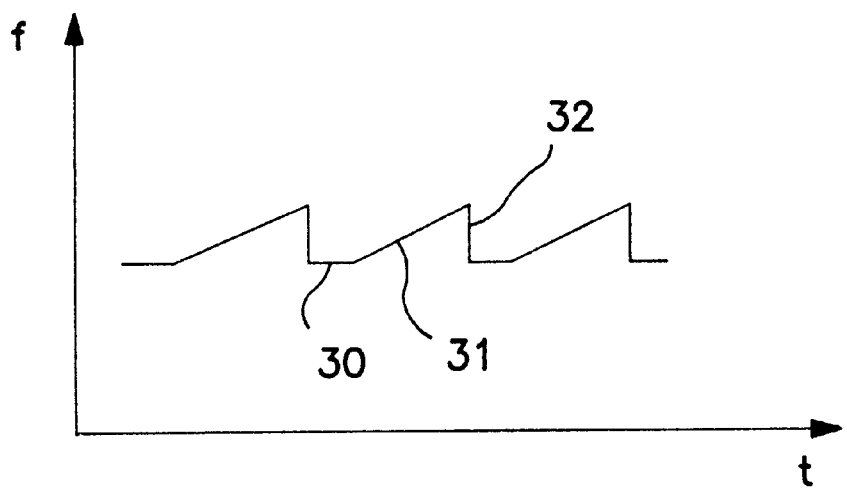
FIG. 2 shows examples of suitable frequency sweeps in a time-frequency diagram.

The radar unit shown in FIG. 1 includes a transmitter 1 and a receiver 2. An aerial 3 is connected to the transmitter and the receiver via a circulator 4. In the transmitter there is an oscillator control device 5 connected to an oscillator 6 with variable frequency. The frequency sweep from the oscillator control device 5 controls the oscillator 6 so that a signal is generated with periodically varying frequency, which signal is transmitted by the aerial 3 via a direction coupler 7 and the circulator 4. The period of a frequency sweep, see FIG. 2, has principally three parts in the form of a constant base frequency 30, a linear frequency sweep 31 and a quick return 32 to the base frequency. The oscillator 6 can work within the Gigahertz range, e.g. 77 GHz. The reflected signal received by the aerial 3 is taken via the circulator to a mixer 8, where the reflected signal is combined with the transmitted signal. After amplification in the amplifier 9 and filtering in the filter 10 a difference signal or beat signal is obtained that is used as the basis for the subsequent signal processing for detecting and eliminating interference and synthesis of the useable signal without interference in a processor block 11 that can also contain what is known as an FFT processor 11.

In the following we discuss first the characterization of the Fourier Transform (The DFT or FFT) for a pulse.

A given sequence of samples is designated $x(0), \ldots, x(N-1)$. The definition of DFT is:

$$X(n) = \Sigma x(k) * \exp(-2 * \pi * i * n * k / N),$$

where i is the complex unit. The DFT is a linear function of the input signal. For a pulse that is equal to A for the sample k=K and 0 otherwise, the DFT is obtained:

$$X(n) = A * \exp(-2 * \pi * i * n * K / N) = A * (\exp(-2 * \pi * i * K / N))^n$$

or expressed differently:

$$X(0) = A$$

$$X(n+1) = X(n) * \exp(-2 * \pi * i * K / N)$$

Each (complex) value in DFT for a pulse at sample K is obtained accordingly from the preceding value by multiplication by a complex number (with the absolute amount 1) that can be calculated from the position of the pulse in the time series. DFT (FFT) of the pulse has thus a constant amount with linear phase.

In the following we discuss a filter for the elimination of a pulse.

Assume that a pulse has been detected at time sample K in a sampled signal with N samples. What was stated in the previous discussion regarding the characterization of the Fourier Transform can then be expressed as follows.

If X(n) is DFT for a pulse at sample K in a time signal of length N it is the case that:

$$X(n+1) - X(n) * \exp(-2 * \pi * i * K / N) = 0$$

or: the FIR filter with (complex) coefficients $[1-\exp(-2*\pi*i*K/N)]$ eliminates the pulse from the DFT (FFT) with interference.

The effect of interference in the from of a pulse is discussed below with reference to the FIG. 3 to 7.

Figure 3:
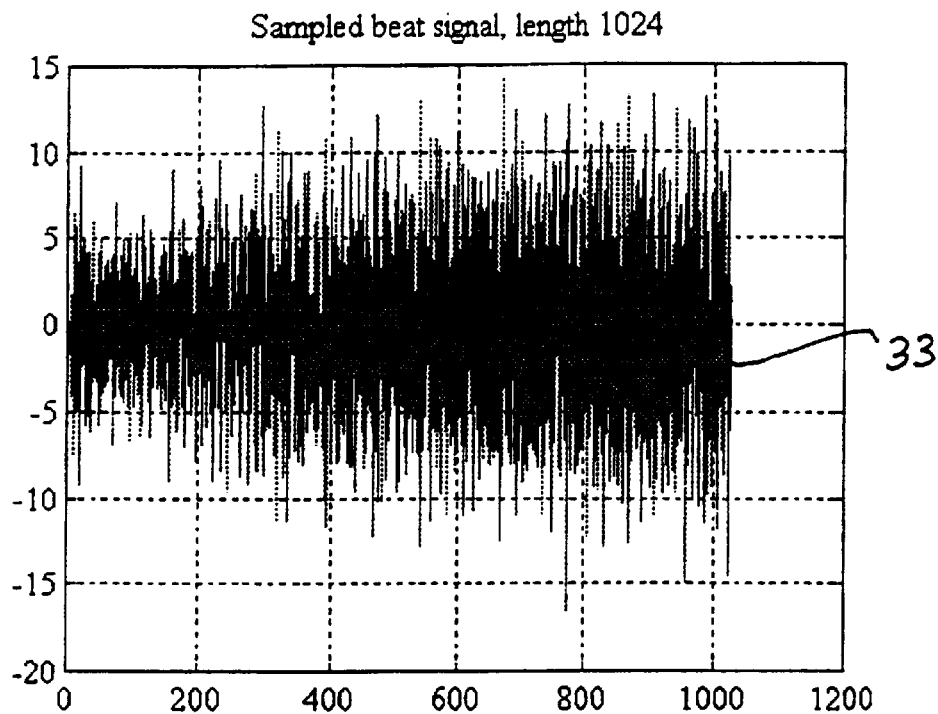
FIG. 3 shows an example of a simulated FMCW beat signal.
Figure 4:
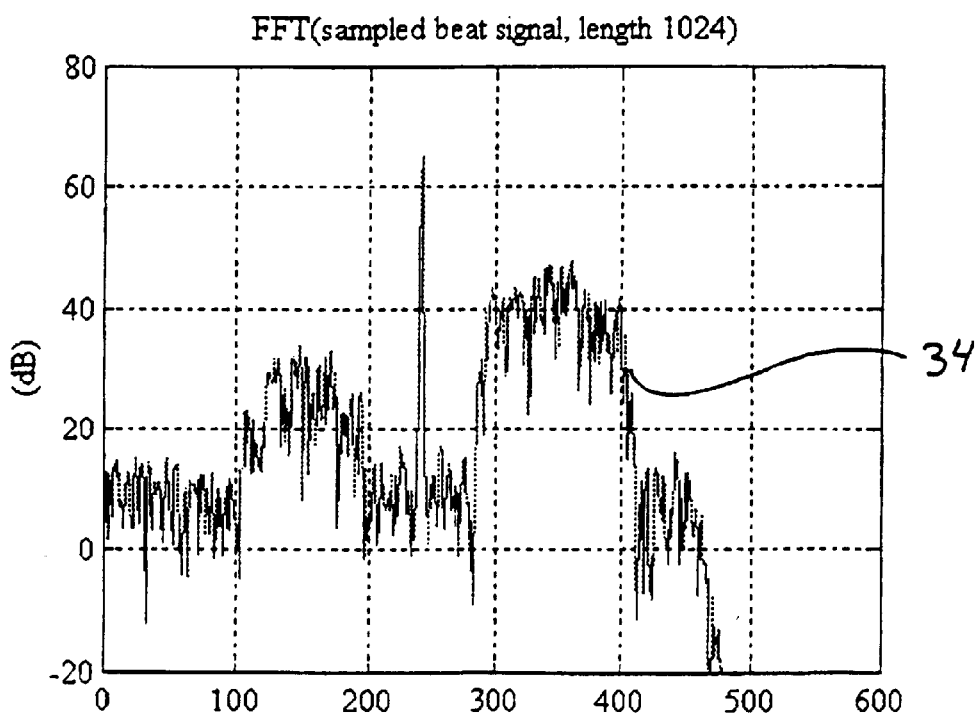
FIG. 4 shows the FFT for the beat signal in FIG. 3
Figure 5:
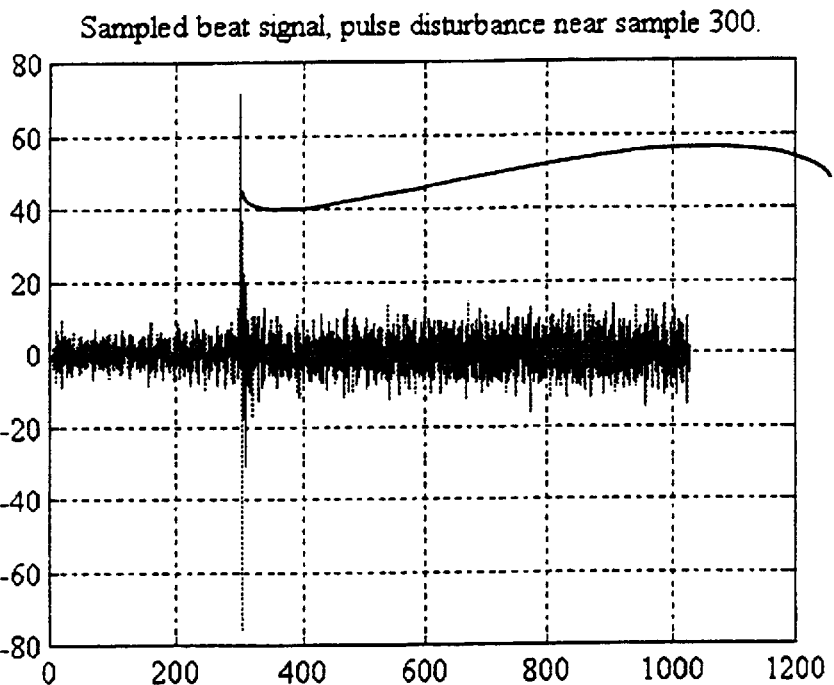
FIG. 5 shows the beat signal in FIG. 3 with an added short pulse.
Figure 6:
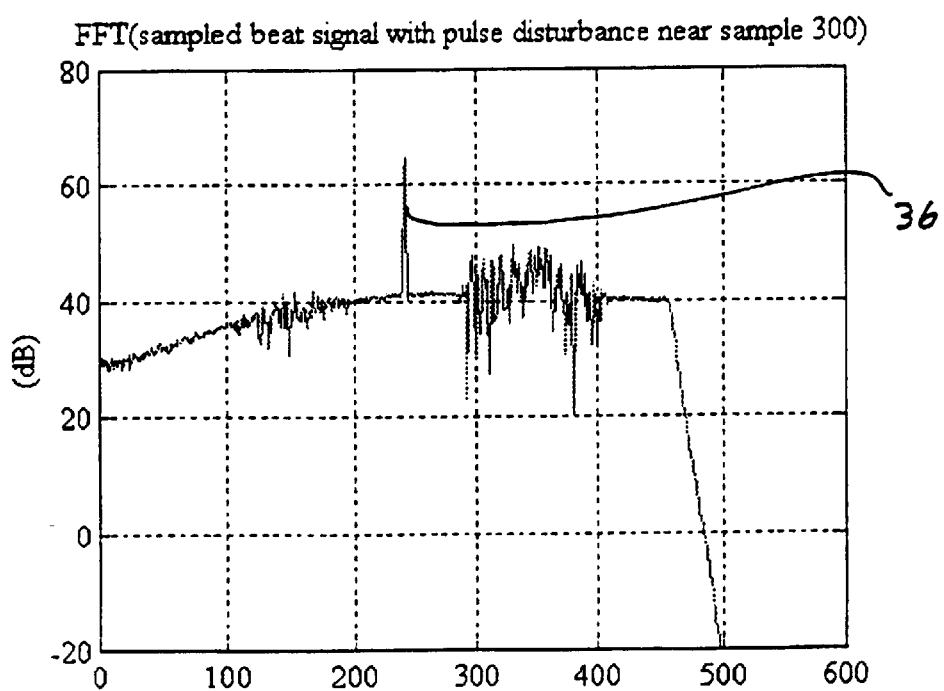
FIG. 6 shows the FFT for the beat signal with interference in FIG. 5.

FIG. 3 shows an example of a simulated FMCW time signal or beat signal 33 sampled at 1024 points. FIG. 4 shows the corresponding FFT 34 of the signal utilizing Hamming windows. In FIG. 5 interference in the form of a pulse 35 has been added to the beat signal 33 close to sample 300. FIG. 6 shows how the added pulse affects the FFT. A comparison with FIG. 4 shows that nearly all the information in the FFT has been submerged by the pulse. Only the strongest target 36 is still visible with reduced contrast.

Figure 7:
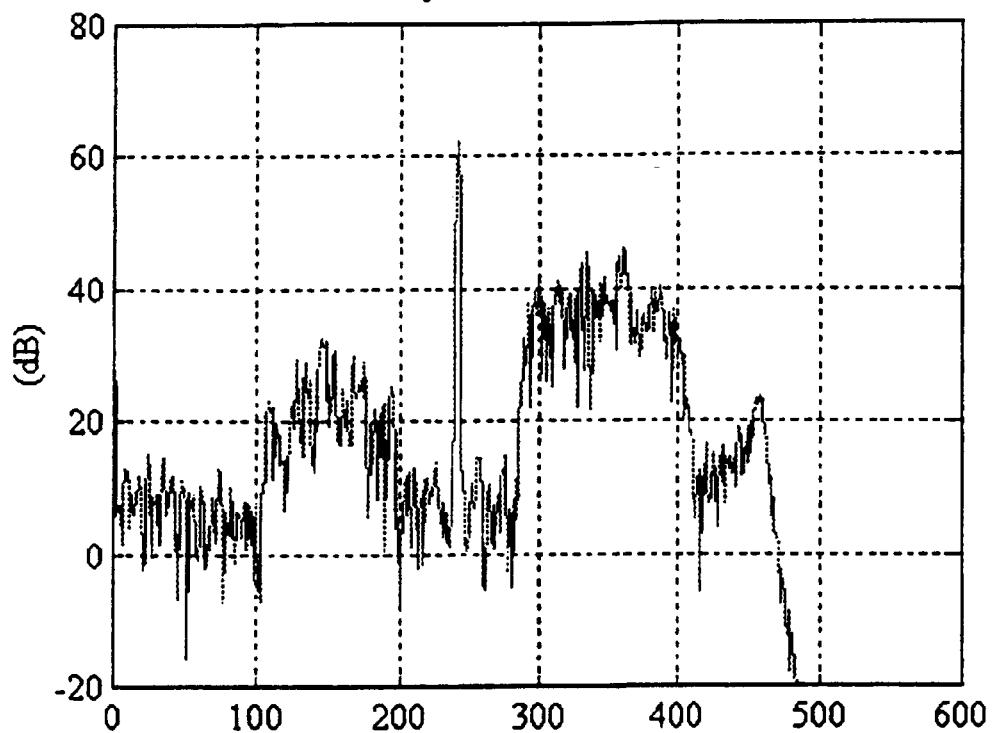
FIG. 7 shows the FFT with interference in FIG. 6 filtered through an FIR filter.

In the example above $2*\pi*K/N = 2*\pi*300/1024 = 1.841$. The pulse [35] should thus for this specific case be filtered away through the FIR filter $[1-\exp(-i*1.841)]$. FIG. 7 shows the FFTs with interference in FIG. 6 filtered with this filter.

By a comparison between FIGS. 4 and 7 it can be seen that the filter achieves a very good reconstruction of the FFT of the beat signal. One difference is that sharp outlines have been widened in a number of samples, to be more precise the length of the filter minus one, i.e. in this case one sample. This difference in pulse widening is much less than the effect caused by conventional methods for eliminating pulses.

In the following we discuss extending this to several pulses.

When several pulses are detected a filter is used that is obtained by polynomial multiplication of a number of factors, one for each pulse.

In the example above an interference at sample 300 is eliminated by a filter with the coefficients [1 $a_{300}$], where $a_{300}=-\exp(-i*2*\pi*300/1024)$. In the same way an interference close to sample 800 is eliminated by a filter with the coefficients [1 $a_{300}$]. The interference at both sample 300 and sample 800 is eliminated by a filter the coefficients of which are obtained by combination of both the small filters. The combination can be carried out as polynomial multiplication if the filters are written with the shift operator q or the z-operator:

$$[1=a_{300}*z^{-1}]*[1+a_{800}*z^{-1}]=[1+(a_{300}+a_{800})*z^{-1}+a_{300}*a_{800}*Z^{-2}]$$

The filter in the example is of order two. In the general case the filter has the same order as the number of pulses. The width of strong contrasts in the reconstructed FFT is the same number of samples as the number of pulses.

The complex coefficients in the filter can be made real by multiplication by a complex-conjugated factor:

$$[1+a*z^{-1}]*[1+\text{conj}(a)*z^{-1}]=[1+2*\text{Re}(a)*z^{-1}+z^{-2}]$$

as the complex number a has the absolute amount 1. Substitute each first order factor with complex coefficients by a second order factor with real coefficients.

The resulting real filter will reduce to zero the number sequence $A*\exp(-2*p*i*K/N)n, n=0,1, \ldots$. The filter reduces to zero real and imaginary parts individually. It can be seen that this is equivalent to the known trigonometric identities (the function name f can be interpreted as sine or cosine)

$$f(\alpha+\theta)+f(\alpha-\theta)=2*\cos(\theta)*f(\alpha)$$

The step to a real filter of higher order has in general no positive effects, but contributes, among other things, to increased widening of contrasts in the FFT.

In the above it has been assumed that the pulses are detected in the time signal (the time domain) but that they are eliminated in the Fourier domain from the complex FFTs with interference. It is, however, quite possible to detect interference in the complex FFTs. If you search for a pulse you can by adaptive methods determine the coefficients a in the filter $[1+a*z^{-1}]$ that most effectively reduce the effect in the FFT. This is a standard problem in adaptive signal treatment, see Haykin, Adaptive Filter Theory, 3rd Ed., Prentice-Hall 1996. The coefficients can be determined by the usual algorithms, e.g. LMS, standardized LMS, RLS, etc, that can handle complex coefficients.

In a corresponding way filters for several pulses can be determined. It is important that the filter is of a sufficient order. The order of the filter should be least correspond to the number of expected pulses.

What is claimed is:

1. A procedure for eliminating an interference of short duration in a FMCW radar unit with a linear frequency sweep, comprising:

combining a transmitted signal and a received signal to form a difference signal constituting a beat signal that contains the differences between the transmitted and received signals, wherein the beat signal is comprised of a wave for each one of a number of targets that reflects the transmitted signal and each of the waves has a frequency, an amplitude and a phase containing information about the target;

sampling the beat signal;

applying a Fourier Transform to the sampled beat signal to obtain a frequency domain representation of the beat signal; and filtering the frequency domain representation using a FIR filter with complex coefficients to remove a wave contribution to the beat signal caused by the interference.

2. A procedure according to patent claim 1, wherein at least one factor per interference of short duration is introduced into the FIR filter.

3. A procedure according to patent claim 2, characterised by at least one additional factor per interference of short duration being introduced into the FIR filter in order to obtain real coefficients.

4. A procedure according to claim 2, wherein detection of the interference of short duration takes place in the time domain, and wherein the filter coefficients of the FIR filter in each factor are calculated from the position of the interference in the time domain.

5. A procedure according to claim 1, wherein detection of the interference of short duration takes place in the frequency domain, and wherein the filter coefficients of the FIR filter are determined adaptively from the Fourier Transform.

6. A procedure for eliminating an interference of short duration in a FMCW radar unit with a linear frequency sweep, comprising:

combining a transmitted signal and a received signal to form a difference signal;

sampling the difference signal;

applying a Fourier Transform to the sampled difference signal to obtain a frequency domain representation of the difference signal; and filtering the frequency domain representation using a FIR filter with complex coefficients to remove a contribution to the difference signal caused by the interference.

* * * * *